3,342,850
2',6'-DISUBSTITUTED PHENYL SALICYLATES
Gordon C. Newland and Gerald R. Lappin, Kingsport, Tenn., assignors to Eastman Kodak Company, Rochester, N.Y., a corporation of New Jersey
No Drawing. Filed Jan. 4, 1963, Ser. No. 249,312
4 Claims. (Cl. 260—473)

This invention relates to poly-α-olefins. In particular, this invention relates to the problem of stabilizing poly-α-olefins relative to ultraviolet light.

Normally solid poly-α-olefins such as the well known normally solid polyethylene and crystalline polypropylene are thermoplastic, synthetic resins which have gained widespread use as materials of construction. However, as is well known, normally solid poly-α-olefins undergo a photochemical degradation when exposed to ultraviolet light. This effect is frequently termed weathering. It appears to be a photooxidation process which causes rupture of the polymer chains and formation of carbonyl (=C=O) groups. As this degradation progresses, articles manufactured from poly-α-olefins tend to crack, become brittle and lose tensile strength to the extent of mechanical failure.

One approach to this problem of ultraviolet light degradation has been to incorporate into poly-α-olefins additives which have been found to function in the specific poly-α-olefins involved to inhibit ultraviolet light degradation.

Certain kinds of phenyl salicylates are known to function as inhibitors of ultraviolet light degradation of poly-α-olefins. However, these phenyl salicylates, while effective to various extents in inhibiting the degradative effect of ultraviolet light on poly-α-olefins, have one distinct disadvantage. Upon exposure to ultraviolet light, poly-α-olefins containing these phenyl salicylates tend to discolor. Everyone of these phenyl salicylates is characterized by at least one unsubstituted ortho position in the "phenyl" portion of the molecule.

This invention is based upon the discovery that substituent groups in both ortho positions of the phenyl portion of the molecule of these phenyl salicylates are effective in minimizing the development of color in poly-α-olefin compositions containing them as ultraviolet light stabilizers.

In summary, this invention comprises a normally solid plastic composition consisting essentially of a normally solid, α-olefin resin portion and at a protective concentration relative to ultraviolet light a 2', 6'-disubstituted phenyl salicylate of the formula:

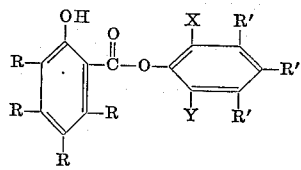

wherein X and Y are independently selected from the group of $C_1$–$C_{18}$ alkyl, $C_1$–$C_{18}$ alkoxy, chlorine and bromine radicals, and each R and R' is independently selected from the group consisting of hydrogen, $C_1$–$C_{18}$ alkyl, $C_1$–$C_{18}$ alkoxy, chlorine and bromine radicals.

The normally solid, α-olefin resin portion of the normally solid plastic composition of this invention consists essentially of at least one, normally solid, α-olefin polymer. Such a polymer, commonly referred to generically as a poly-α-olefin, is one which is derived from an α-monoolefinic hydrocarbon having 2–10 carbon atoms. Such a polymer is provided by the normally solid homopolymers of α-monoolefinic hydrocarbons having generally 2–10 carbon atoms, perferably 2–6 carbon atoms and usually 2–4 carbon atoms. It is also provided by the normally solid copolymers (which include graft polymers, addition polymers, block polymers and the like) of α-monoolefinic hydrocarbons having generally 2–10 carbon atoms, preferably 2–6 carbon atoms and usually 2–4 carbon atoms, as well as of these α-monoolefinic hydrocarbons and other compounds. Examples of a normally solid polymer derived from an α-monoolefinic hydrocarbon having 2–10 carbon atoms include the linear and branched, low density and high density, crystalline and amorphous, normally solid, homopolymers and copolymers of ethylene, propylene, 1-butene, isobutylene, 1-pentene, 2-methyl-1-pentene, 3-methyl-1-butene, 1-hexene, 3,3-dimethyl-1-butene, 1-heptene, 1-octene, 1-nonene, 1-decene, 4-methyl-1-pentene, 4-methyl-1-hexene, 5-ethyl-1-hexene, 6-methyl-1-heptene, 6-ethyl-1-heptene, styrene, allyl benzene, and the like. Processes for preparing a normally solid α-olefin polymer are well known and described in detail in the prior art. See, for example, the U.S. Patent, No 2,153,553, to Fawcett et al., the U.S. Patent, No. 2,912,429, to Cash and the U.S. Patent, No. 2,917,500, to Hagemeyer et al. In general, a normally solid, α-olefin polymer is a thermoplastic material which at 20° C. is solid. It includes the so-called poly-α-olefin waxes which usually have average molecular weights in a range from about 3,000 to about 12,000.

The normally solid, α-olefin resin portion of the poly-α-olefin composition of this invention, in addition to at least one normally solid, α-olefin polymer, can also comprise other polymeric components. Thus, it can comprise a normally solid polymer derived from another α-monoolefinic hydrocarbon having 2–10 carbon atoms. It can comprise a different kind of polymer, generally present as a physical property improver.

The normally solid, poly-α-olefin compositions of this invention can also comprise other additives such as, for example, antioxidants, thermal stabilizers, anticorrosion additives, antistatic agents, foaming agents, plasticizers, colorants such as dyes and pigments, waxes, mold release agents, slip agents, anti-blocking agents, fillers, extenders, and the like including physical property improvers other than polymeric compounds.

The 2',6'-disubstituted phenyl salicylate of this invention is characterized by color stability in poly-α-olefins when exposed to ultraviolet light. Typical specific examples of a 2',6'-disubstituted phenyl salicylate of this invention are:

2',6'-dimethylphenyl salicylate
2',6'-dimethylphenyl 5-t-butylsalicylate
2',6'-dimethyl-4'-octadecylphenyl salicylate
2',6'-dimethylphenyl 5-(1,1,3,3-tetramethylbutyl) salicylate
2',6'-dimethylphenyl 4-dodecyloxysalicylate
2',6'-didodecyl-4-methylphenyl salicylate
2',6'-dichlorophenyl salicylate
2',4',6'-trichlorophenyl salicylate
2'-isopropyl-6'-methylphenyl salicylate
2'-isopropyl-6'-dodecylphenyl salicylate
2',6'-dichloro-4-methylphenyl salicylate
2'-isooctyl-6'-n-nonylphenyl salicylate
2',6'-dimethylphenyl 5-chlorosalicylate
2',6'-dichlorophenyl 5-chlorosalicylate
2',6'-dibromophenyl salicylate.

2',6'-disubstituted phenyl salicylates having high molecular weight substituents in the 2' and 6' positions are especially preferred because of their low volatility even at normally encountered, poly-α-olefin processing temperatures.

The 2',6'-disubstituted phenyl salicylates of this invention are readily synthesized by reacting the corresponding salicylic acid with the corresponding 2,6-disubstituted phenol. One chemically equivalent quantity of the corresponding salicylic acid is admixed with one chemically equivalent quantity of the corresponding 2,6-disubstituted phenol while establishing and maintaining the temperature of the resulting mixture at about 120–150° C. In some cases, xylene is added as a solvent or diluent so that the reaction temperature is maintained by refluxing. A quantity of phosphorous oxychloride, somewhat in excess of 3 chemical equivalents, is added cautiously with stirring to the mixture. Stirring at a temperature of about 120–150° C. is continued for 1–5 hours. Thereafter, the reaction mixture is cooled, some hexane is added, and the resulting solution is washed free of acid with an aqueous alkaline solution such as an aqueous solution of sodium bicarbonate. Then the solution is washed with water until the washings are neutral. The solvent is stripped off and the residue purified by distillation or recrystallization, depending upon the physical state of the particular 2′,6′-disubstituted phenyl salicylate involved.

A number of the 2′,6′-disubstituted phenyl salicylates of this invention appear to be new compounds. Examples of these particular 2′,6′-disubstituted phenyl salicylates and typical melting or boiling points of them are:

2′,6′-dimethylphenyl salicylate _____ B.P. 123–126° C. at 0.5 mm. Hg pressure.
2′,6′-dimethylphenyl 5-t-butylsalicylate _____ M.P. 133–135° C.
2′,6′-didodecyl-4-methylphenyl salicylate _____ B.P. 165° C. at 1.8μ Hg pressure.
2′,6′-dimethylphenyl 4-dodecyloxysalicylate ___ M.P. 41–42° C.
2′,6′-dimethyl-4-octadecylphenyl salicylate __ B.P. 135–139° C. at 1.5μ Hg pressure.
2′,6′-dimethylphenyl 5-(1,1,3,3-tetramethylbutyl)-salicylate _____ M.P. 85–86° C.

Concentration of the 2′,6′-disubstituted phenyl salicylate of this invention in the normally solid plastic composition depends generally upon the degree of ultraviolet light stabilization desired. This in turn depends upon a number of factors including subsequent environmental conditions to which the poly-α-olefin composition is intended to be exposed. In general, however, a concentration of the 2′,6′-disubstituted phenyl salicylate in a range from about 0.1 to about 10% by weight of the total α-olefin polymeric content of the composition is an effective concentration for most end uses of the composition and gives satisfactory results.

The normally solid, poly-α-olefin composition of this invention is made by incorporating the 2′,6′-disubstituted phenyl salicylate into the normally solid resin portion of the composition. Generally, such incorporation is performed by any one of a number of known methods, such as roll compounding, extrusion, solvent mixing and the like. For example, such incorporation can be performed by heating or otherwise softening the normally solid resin portion to a workable consistency and then working in, as by roll compounding, the 2′,6′-disubstituted phenyl salicylate until a substantially uniform blend or dispersion is obtained. Generally, such incorporation takes place at the same time that other additives are normally incorporated into the resin portion of the composition and usually along with such other additives as the formulation of the particular plastic composition requires.

The normally solid plastic composition of this invention is useful in coatings and as a material of construction for shaped articles. Thus, the composition can be made into various shaped articles such as, for example, pellets, sheeting, films, bars, tubes, filaments, fibers, specially shaped structural elements and the like as by conventional casting and molding techniques which include extrusion, blow molding and the like.

This invention is further illustrated by the following examples of various aspects thereof, including preferred specific embodiments of the invention. This invention is not limited to these specific embodiments unless otherwise indicated.

EXAMPLES 1–5

These examples illustrate specific embodiments of a polyethylene composition of this invention.

*Example 1 formulation*

Components: Concentration in parts by weight
Normally solid polyethylene _____ 100
2′,6′-dimethylphenyl salicylate _____ 1

*Example 2 formulation*

Components: Concentration in parts by weight
Normally solid polyethylene _____ 100
2′,6′-dimethylphenyl 5-butylsalicylate _____ 1

*Example 3 formulation*

Components: Concentration in parts by weight
Normally solid polyethylene _____ 100
2′,6′-dimethylphenyl 4-dodecyloxysalicylate ___ 1

*Example 4 formulation*

Components: Concentration in parts by weight
Normally solid polyethylene _____ 100
2′,6′-dimethyl-4′-octadecylphenyl salicylate ___ 1

*Example 5 formulation*

Components: Concentration in parts by weight
Normally solid polyethylene _____ 100
2′,6′-didodecyl-4′-methylphenyl salicylate _____ 1

The specific compositions of these formulations are each prepared by banding the resin portion of the composition on hot milling rolls, the temperature of the front roll being at 270° F. and the temperature of the rear roll being at 220° F. As soon as the resin portion has reached a workable consistency in each case the specific 2′,6′-disubstituted phenyl salicylate is then added to the resin portion on the rolls and milled thereby into the resin portion. Addition of the 2′,6′-disubstituted phenyl salicylate is as rapid as possible so as to keep the total milling time to about a total of 4 minutes. At the end of this time, the resulting polyethylene composition is stripped from the rolls and then granulated. If desired, the granulated composition is then cast, molded or extruded into the desired article.

EXAMPLES 6–12

These examples illustrate specific embodiments of a polypropylene composition of this invention.

The formulations of these specific embodiments are:

*Example 6 formulation*

Components: Concentration in parts by weight
Normally solid polypropylene _____ 100
2′,6′-dimethylphenyl salicylate _____ 1

*Example 7 formulation*

Components: Concentration in parts by weight
Normally solid polypropylene _____ 100
2′,6′-dimethylphenyl 5-t-butylsalicylate _____ 1

*Example 8 formulation*

Components: Concentration in parts by weight
Normally solid polypropylene _____ 100
2′,6′-dimethyl-4′-octadecylphenyl salicylate ___ 1

Example 9 formulation

Components: Concentration in parts by weight
- Normally solid polypropylene _____ 100
- 2',6'-dimethylphenyl 5-(1,1,3,3-tetramethylbutyl)salicylate _____ 1

Example 10 formulation

Components: Concentration in parts by weight
- Normally solid polypropylene _____ 100
- 2',6'-dimethylphenyl 4-dodecyloxysalicylate ___ 1

Example 11 formulation

Components: Concentration in parts by weight
- Normally solid polypropylene _____ 100
- 2',6'-didodecyl-4'-methylphenyl salicylate ____ 1

Example 12 formulation

Components: Concentration in parts by weight
- Normally solid polypropylene _____ 100
- 2',4',6'-trichlorophenyl salicylate _____ 1

Example 13 formulation

Components: Concentration in parts by weight
- Normally solid polypropylene _____ 100
- 2',6'-dichlorophenyl salicylate _____ 1

Example 14 formulation

Components: Concentration in parts by weight
- Normally solid polypropylene _____ 100
- 2',6'-dioctadecylphenyl salicylate _____ 1

Example 15 formulation

Components: Concentration in parts by weight
- Normally solid polypropylene _____ 100
- 2'-isopropyl-6'-methylphenyl salicylate _____ 1

Example 16 formulation

Components: Concentration in parts by weight
- Normally solid polypropylene _____ 100
- 2'-isopropyl-6'-dodecylphenyl salicylate _____ 1

Example 17 formulation

Components: Concentration in parts by weight
- Normally solid polypropylene _____ 100
- 2',6'-dichloro-4'-methylphenyl salicylate _____ 1

Example 18 formulation

Components: Concentration in parts by weight
- Normally solid polypropylene _____ 100
- 2'-isooctyl-6-n-nonylphenyl salicylate _____ 1

Example 19 formulation

Components: Concentration in parts by weight
- Normally solid polypropylene _____ 100
- 2',6'-dimethylphenyl 5-chlorosalicylate _____ 1

Example 20 formulation

Components: Concentration in parts by weight
- Normally solid polypropylene _____ 100
- 2',6'-dichlorophenyl 5-chlorosalicylate _____ 1

The specific compositions of the foregoing formulations are prepared in each case by admixing the 2',6'-disubstituted phenyl salicylate with the polypropylene under a nitrogen atmosphere in a C.W. Brabender Plastograph for 5 minutes at 325° F. The resulting slab is then granulated. If desired, the granulated composition in each case can then be cast, molded or extruded into the desired article.

EXAMPLES 13–18

These examples illustrate specific embodiments of a poly(1-butene) composition of this invention.

The formulations of these specific embodiments are:

Example 21 formulation

Components: Concentration in parts by weight
- Normally solid poly(1-butene) _____ 100
- 2',6'-dimethylphenyl salicylate _____ 1

Example 22 formulation

Components: Concentration in parts by weight
- Normally solid poly(1-butene) _____ 100
- 2',6'-dimethylphenyl 5-t-butylsalicylate _____ 1

Example 23 formulation

Components: Concentration in parts by weight
- Normally solid poly(1-butene) _____ 100
- 2',6'-dimethyl-4'-octadecylphenyl salicylate ___ 1

Example 24 formulation

Components: Concentration in parts by weight
- Normally solid poly(1-butene) _____ 100
- 2',6'-didodecyl-4'-methylphenyl salicylate _____ 1

Example 25 formulation

Components: Concentration in parts by weight
- Normally solid poly(1-butene) _____ 100
- 2',6'-dimethylphenyl 4-dodecyloxysalicylate ___ 1

Example 26 formulation

Components: Concentration in parts by weight
- Normally solid poly(1-butene) _____ 100
- 2',6'-dimethylphenyl 5-(1,1,3,3-tetramethylbutyl)-salicylate _____ 1

These specific poly(1-butene) compositions are made by admixing the components thereof on hot compounding rolls for 4 minutes, the front roll being at 240° F. and the rear roll at 185° F. The resulting roll mix can then be compression molded into plates, sheets and the like.

Samples of specific embodiments of the poly-α-olefin composition of this invention and other poly-α-olefin compositions have been prepared and tested. The tests employed are described as follows.

*Artificial weathering test.*—In this test, three specimens of the sample to be tested are bent into U-shape and while so bent are inserted into a narrow channel. The channel is placed into a modified Atlas Twin-Arc Weather-Ometer [Anal. Chem., 25, 460 (1953)]. The specimens are periodically observed for the development of cracks visible under 3× magnification.

When such cracks have developed in each specimen, the exposure time to bring about this condition is calculated. When each of the specimens of a sample have developed such cracks, the stress-crack life of the sample is then determined. This is the average exposure time required for all three specimens to develop these cracks.

In addition, when such cracks have developed in the specimens, they are also inspected for change in color as well as for "blooming" or exudation of the phenyl salicylate.

*Outdoor weathering test.*—Ten specimens of the sample to be tested are bent into U-shape and mounted in a narrow channel. The channel is then placed into a rack stationed outdoors and adapted to place the specimens at an angle of 36.5 degrees to the horizontal. After six months' exposure time has elapsed, the specimens are inspected for change in color.

*Volatilization test.*—A film 2 mils thick is compression molded from a 125 mils thick plate of the sample to be tested. The film is then examined by ultraviolet spectroscopy and the concentration of the phenyl salicylate present in the film calculated. In such fashion, the loss of the phenyl salicylate during compounding and molding is ascertained.

Table I summarizes the results obtained in the testing of samples of specific polyethylene compositions. The samples were prepared in accordance with the procedure described herein at the end of the Examples 1–5 formulations from a conventional low density polyethylene of melt index 2 and the additive indicated in Table I for that sample at a concentration of 1 part of the additive per 100 parts of polyethylene. The resultant roll mix in each case was compression molded into flat plates 125 mils thick. Test specimens having the dimensions 1.5 inches by 0.5 inch were cut from these plates, bent into U-shape and mounted in a 0.5 inch wide channel for the artificial weathering test. In addition, the volatilization test was performed on the plates.

disubstituted phenyl salicylates were protected to a high degree relative to ultraviolet light degradation. In addition, it will be observed that these samples did not discolor upon exposure to ultraviolet light.

Table II summarizes the results obtained in the testing of samples of specific polypropylene compositions. The samples were prepared from a conventional, crystalline polypropylene containing the antioxidants butylated hydroxytoluene and dilauryl 3,3'-thiodipropionate, each at a concentration of about 0.1% by weight of the propylene polymer. The samples were prepared in accordance with the procedure described at the end of the Examples 6–20 formulations from this normally solid polypropylene and the additional additives indicated in Table II, the concentration of the indicated additional additives being 1 part by weight per 100 parts by weight of the crystalline polypropylene. The plastograph slab in each case was granulated and injection molded into tensile bars each of which was 0.0625 inch thick, 2.5 inches long and 0.5 inch wide at the ends with a neck section 1.0 inch long and 0.25 inch wide. The tensile bar specimens of each sample were then subjected to the tests indicated in Table II for that sample. In the case of the artificial weathering test, 3 tensile bar specimens of each sample, bent into

TABLE I

| Sample No. | Additive | Artificial Weathering Test | | | Volatilization Test |
|---|---|---|---|---|---|
| | | Stress-Crack Life In Hours | Color Change | Exudation | Loss in Percent by Weight |
| 1 | None | 330 | None | None | 62 |
| 2 | Phenyl salicylate | 500 | do | do | |
| 3 | Phenyl 3-phenylsalicylate | 5,840 | Some | Some | 44 |
| 4 | p-t-Butylphenyl salicylate | 800 | do | None | 53 |
| 5 | 2',6'-dimethylphenyl salicylate | 800 | None | do | 0 |
| 6 | 2',6'-didodecyl-4'-methylphenyl salicylate | 2,200 | do | Slight | |

Samples 5 and 6, it will be observed, correspond to the polyethylene formulations of Examples 1 and 2.

It will be observed that the samples containing 2',6'-

U-shape and mounted upside down in a stainless steel channel, were employed. The Outdoor Weathering Test was conducted at Kingsport, Tennessee.

TABLE II

| Sample No. | Additional Additive | Artificial Weathering Test | | | Outdoor Weathering Test—Color Change | Volatilization Test—Loss in Percent by Weight |
|---|---|---|---|---|---|---|
| | | Stress-Crack Life in Hours | Color Change | Exudation | | |
| 1 | None | 90 | None | None | None | 65 |
| 2 | Phenyl salicylate | 130 | Very Slight | do | Light Yellow | 46 |
| 3 | p-t-Octylphenyl salicylate | 1,200 | Much | | | 34 |
| 4 | o-t-octylphenyl salicylate | 420 | Some | do | Light Yellow | 61 |
| 5 | 2'-dodecyl-4'-methylphenyl salicylate | | | | None | 36 |
| 6 | 2',6'-dimethylphenyl salicylate | 500 | None | None | do | 26 |
| 7 | 2',6'-dimethylphenyl 5-t-butylsalicylate | 420 | do | do | do | |
| 8 | 2'6'-dimethyl-4'-octadecylphenyl salicylate | 550 | do | do | do | |
| 9 | 2',6'-dimethylphenyl 5-(1,1,3,3-tetramethylbutyl) salicylate | 385 | do | do | do | |
| 10 | 2',6'-dimethylphenyl 4-dodecyloxysalicylate | 460 | None | do | None | 31 |
| 11 | 2',6'-didodecyl-4'-methylphenyl salicylate | 410 | Slight | do | Very Slightly Yellow | 22 |
| 12 | 2',6'-dichlorophenyl salicylate | 170 | None | None | None | |
| 13 | 2',4',6'-trichlorophenyl salicylate | | | | do | |
| 14 | 2',6'-dioctadecylphenyl salicylate | | | | do | |
| 15 | 2'-isopropyl-6'-methylphenyl salicylate | | | | do | |
| 16 | 2'-isopropyl-6'-dodecylphenyl salicylate | | | | do | |
| 17 | 2'-dichloro-4'-methylphenyl salicylate | | | | do | |
| 18 | 2'-isooctyl-6-n-nonylphenyl salicylate | | | | do | |
| 19 | 2',6'-dimethylphenyl 5-chlorosalicylate | | | | do | |
| 20 | 2',6'-dichlorophenyl 5-chlorosalicylate | | | | do | |

Samples 6–20 correspond to (but are not the same as because of the antioxidants) the formulations of Examples 6–11, 13, 12 and 14–20, respectively.

The data of Table II demonstrate that the 2′,6′-disubstituted phenyl salicylates of this invention in general are effective, noncoloring, ultraviolet light stabilizers for polypropylene. The data also indicate the 2′,6′-disubstituted phenyl salicylates of this invention are in general compatible with normally solid polypropylene. Moreover, the data of Table II demonstrate that the 2′,6′-disubstituted phenyl salicylates having high molecular weight substituents at the 2′ and 6′ positions are retained to a much greater extent in polypropylene under the usual polypropylene processing conditions than the 2′,6′-disubstituted phenyl salicylates having lower molecular weight substituents at the 2′ and 6′ positions.

Table III summarizes the results obtained in testing samples of specific poly(1-butene) compositions. The samples were prepared in accordance with the procedure set forth after the Examples 21–26 formulations. They were so prepared from a conventional, normally solid poly(1-butene) having an inherent viscosity of 1.29 and the additive indicated in Table III for each sample, the concentration of the additive in each case being 1 part by weight per 100 parts of the poly-1-butene). The resulting mix in each case was compression molded into a flat plate 125 mils thick. For the artificial weathering test, specimens 1.5 inches by 0.5 inch were cut from the molded plate, bent into U-shape and, while so bent, inserted into a 0.5 inch wide channel.

TABLE III

| Sample No. | Additive | Artificial Weathering Test | |
|---|---|---|---|
| | | Stress-Crack Life In Hours | Exudation |
| 1 | None | 40 | None. |
| 2 | 2′,6′-dimethylphenyl salicylate | 104 | Do. |
| 3 | 2′,6′-dimethylphenyl 5-t-butyl-salicylate. | 86 | Do. |
| 4 | 2′,6′-dimethyl-4′-octadecylphenyl salicylate. | 86 | Do. |
| 5 | 2′,6′-didodecyl-4′-methylphenyl salicylate. | 200 | Do. |
| 6 | 2′,6′-dimethylphenyl 5-(1,1,3,3-tetramethylbutyl)-salicylate. | 90 | Do. |

Samples 2–6, it will be observed, have the formulations of Examples 21–24 and 26, respectively. None of the specimens of these samples showed a change of color after their exposure to ultraviolet light.

Thus, the 2′,6′-disubstituted phenyl salicylates of this invention are in general effective ultraviolet light stabilizers for poly(1-butene) and upon exposure to ultraviolet light do not discolor poly(1-butene).

Similar results are obtained with other α-olefin polymers and the 2′,6′-disubstituted phenyl salicylates of this invention.

Thus, this invention provides a new poly-α-olefin composition having a high degree of protection relative to the adverse effect of ultraviolet light and stabilized relative to color change due to the effect of ultraviolet light on the ultraviolet light stabilizer.

Other advantages, features and embodiments of this invention will be apparent to those in the exercise of ordinary skill in the art after reading the foregoing disclosure. In this regard, while specific embodiments of this invention have been described in considerable detail, variations and modifications of these embodiments can be effected within the spirit and scope of this invention as disclosed and claimed.

The embodiments of the invention in which an exclusive property or privilege is claimed are defined as follows.
1. 2′,6′-dimethylphenyl 5-t-butylsalicylate.
2. 2′,6′-didodecyl-4′-methylphenyl salicylate.
3. 2′6′-dimethyl-4′-octadecylphenyl salicylate.
4. 2′,6′ - dimethylphenyl-5-(1,1,3,3 - tetramethylbutyl)-salicylate.

References Cited
UNITED STATES PATENTS

| 2,336,223 | 12/1943 | Coleman et al. | 260—474 |
| 2,474,005 | 6/1949 | Martin et al. | 260—474 |
| 2,792,380 | 5/1957 | Slocombe | 260—45.85 |
| 2,839,492 | 6/1958 | Caldwell et al. | 260—45.85 |
| 2,874,181 | 2/1959 | Murray | 260—473 |
| 3,033,814 | 5/1962 | Tholstrup | 260—45.85 |
| 3,126,409 | 3/1964 | Arthen | 260—473 |
| 3,196,128 | 7/1965 | Tazewell et al. | 260—45.75 |

LORRAINE A. WEINBERGER, *Primary Examiner.*

LEON J. BERCOVITZ, RICHARD K. JACKSON,
*Examiners.*

M. J. WELSH, S. B. WILLIAMS, *Assistant Examiners.*